United States Patent [19]
Lee

[11] Patent Number: 5,491,895
[45] Date of Patent: Feb. 20, 1996

[54] COLD CEREAL SPOON

[76] Inventor: Denise D. Lee, 110 S. 300 East Apt. 5, Salt Lake City, Utah 84111

[21] Appl. No.: 349,182

[22] Filed: Dec. 5, 1994

[51] Int. Cl.⁶ .............................. G01F 19/00; A61J 7/00
[52] U.S. Cl. ................................. 30/125; 30/141
[58] Field of Search ...................... 30/123.3, 124, 30/125, 141, 41, 86, 324

[56]         References Cited
         U.S. PATENT DOCUMENTS 2,837,822   6/1958   Wille .......................................... 30/125

FOREIGN PATENT DOCUMENTS 730312     1/1943   Germany ................................ 30/324
80/02875  12/1980   WIPO ..................................... 30/141

*Primary Examiner*—Douglas D. Watts
*Attorney, Agent, or Firm*—Marcus G. Theodore

[57]            ABSTRACT

A liquid or powder storage and dispensing spoon having a squeezable handle defining an internal reservoir to store liquids or powders before the same are squeezed through a dispensing port into an attached bowl for use.

9 Claims, 3 Drawing Sheets

COLD CEREAL SPOON

BACKGROUND OF THE INVENTION

1. Field

This invention pertains to spoons. More particularly, it relates to a liquid dispensing spoon for use with cold cereals.

2. State of the Art

Numerous types of spoons are known. For example, a number of measuring spoons are known. Ceccarelli, U.S. Pat. No. 3,931,741 discloses a combined measuring spoon and receptacle for accurately measuring liquid medicines stored in the handle of the spoon for delivery of various sized dosages into a graduated bowl. Schaffer, U.S. Pat. No. 2,487,274 discloses a medicine bottle with a spoon hinged to the bottle cap for measuring medicine dosages. These measuring spoon and receptacle devices typically have a rigid storage vessel which is filled via a removable plug. The plug is then opened to break the receptacle vacuum and allow the liquid contents of the receptacle to fill the bowl of the spoon.

Another dosage spoon without a liquid receptacle is Hein, U.S. Pat. No. 3,369,407.

Other ladle type spoons are known, such as West, U.S. Pat. No. 3,063,110 disclosing a tiltable plumber's hand ladle. Still other dispensing spoons, such as Myers, U.S. Pat. No. 2,174,388 are known.

Cited for general interest are: Saunders, U.S. Pat. No. 3,334,778, a can top with opener and spoon; and Ahlstrand,. U.S. Pat. No. 2,597,275, a spoon holder clip hung on the wall of a bowl.

None of these inventions provides a liquid storage and dispensing spoon for use with dry cereals.

SUMMARY OF THE INVENTION

The invention comprises a storage and dispensing spoon for liquids or powders comprising-a squeezable handle with first and second ends and having walls defining at least one interior storage reservoir into which liquids, powders, or the like may be stored before using. The handle first end has at least one port for and in communication with each respective interior storage reservoir. When the handle is squeezed, stored liquids or powders are expelled from the storage reservoir through the port to fill the bowl attached proximate the first end of the handle. The squeezable spoon is constructed of a flexible material, such as polyethylene or a similar blow molded squeezable plastic, of sufficient thickness and rigidity to insure that the spoon bowl does not droop, but not too thick to prevent the handle from being squeezed.

The plastic handle is then squeezed to create a partial vacuum in the reservoir when dipped into milk, and then release to draw in milk into the reservoir. The spoon bowl is then dipped into and filled with dry cereal by a user. Before eating, the user then squeezes the handle and dispenses the desired amount of milk into the cereal filled bowl to eat along with the cereal. The objective of this embodiment is to maintain the crispness of dry cereal eaten with milk. It is also particularly useful to eat dry cereal when riding in a rough plane ride or on a bumpy train to prevent milk spillage.

In this preferred embodiment, there are no independent filling means associated with the handle. Instead, the handle is constructed of a squeezable material which compresses and expands the interior water impervious reservoir to selectively empty the reservoir of air. The handle port is then placed into a desired liquid or powder, and the handle is released allowing a partial vacuum created in the compressed handle to draw in liquids or powers is into the storage reservoir and fill the same. After filling the reservoir with the desired liquid or powder, the spoon bowl is then filled with a desired cereal or food, and the handle squeezed to add some of the stored liquid or powder just before eating. The exact amount of liquid added is dependent upon the taste of the user. To more efficiently regulate the flow of liquids or powers, an interior gasket with a small slit may be employed to cover the interior of the dispensing port.

If the filled cereal spoon reservoir is to be stored before use, to insure that stored liquids or powders do not prematurely leak, the port may be sealed with a removable exterior storage tape which is removed just prior to use.

In other embodiments, a rigid handle may be employed and adapted with pump or syringe type filling means to draw in fluids and powders into the internal reservoir for storage. These fluids or powders are then selectively dispensed by reversing the filling means to drain the contents of the reservoir into the bowl.

In another preferred embodiment, the handle has two storage reservoirs. These storage reservoirs have ports in close proximity to one another. When each separately filled with different powders or liquids, they are admixed in the bowl in a swirl pattern when the handle is squeezed. This particular embodiment is particularly suited for storing and swirl mixing chocolate and vanilla snack puddings into colorful treats for children. The dual colored chambers also add to the appeal of the dispensing spoon, when constructed of a transparent material.

To aid in filling the spoon handle with powders, it is preferable to include in the second end of the handle a cap covered fill hole through which the powders may be poured. Alternatively, the spoon bowl may be structured as a removable cap which screws onto the open end of a threaded handle defining an open topped reservoir.

A removable plug or gasket is then included to seal the fill hole after the handle is filled with a desired liquid or powder. This particular embodiment is particularly useful to campers who want to take powders for mixing with fluids, but do not want the same exposed to moisture prior to use. For camping use, the handle is filled with a desired powder, such as cocoa, coffee, powdered cream, sugar, etc., and the drain port sealed with a removable tape, gasket, or plug. When needed, the plug, gasket, or tape is then removed and the powder allowed to fill the spoon bowl for stirring into water, or other desired liquids.

Although the size and capacity of the spoon bowl and reservoir are not critical, if the powders or liquids have to be measured after dispensing, the size of the spoon bowl may be sized to hold a conventional unit of capacity such as a teaspoon or tablespoon. The capacity of the handle may also be designed to hold conventional serving units. For example, snack puddings generally are packed in 4 to 6 ounce servings. To store and dispense snack puddings, the handle reservoir may also be sized to also dispense a conventional 4 to 6 ounce serving.

Preferably, the the spoon is colored or patterned to suit the preference of a user. If the spoon is constructed of a polyethylene plastic, it may be transparent or translucent to reveal the powders or liquids stored therein, or opaque to conceal the interior contents. For translucent embodiments, the storage reservoir may be shaped into a pleasing shape or design which changes the color of the spoon handle when filled with an opaque colored material.

When designed for use with children, the shape of the spoon handle and bowl is also preferably decorated or molded into a cartoon or animal character to please the user. This embodiment thus produces an appealing storage container for powders or liquids stored in the handle reservoir for admixing with another food stirred by or eaten directly from the spoon bowl, when deposited therein. For example, the cereal spoon reservoir may be filled with snack puddings and the dispensing port or ports sealed with a removable tape. Just prior to use, the tape is removed, the pudding squeezed into the spoon bowl, and eaten. The spoon reservoir is then rinsed and cleaned with water or similar fluids repeatedly drawn into and expelled out of the reservoir. The empty spoon reservoir may then be filled with milk and used to eat dry cereals as a cereal spoon.

The invention thus provides an appealing food storage container for liquids or powders, which can also be used to eat dry cereals.

DESCRIPTION OF THE ILLUSTRATED EMBODIMENTS

Figure 1:
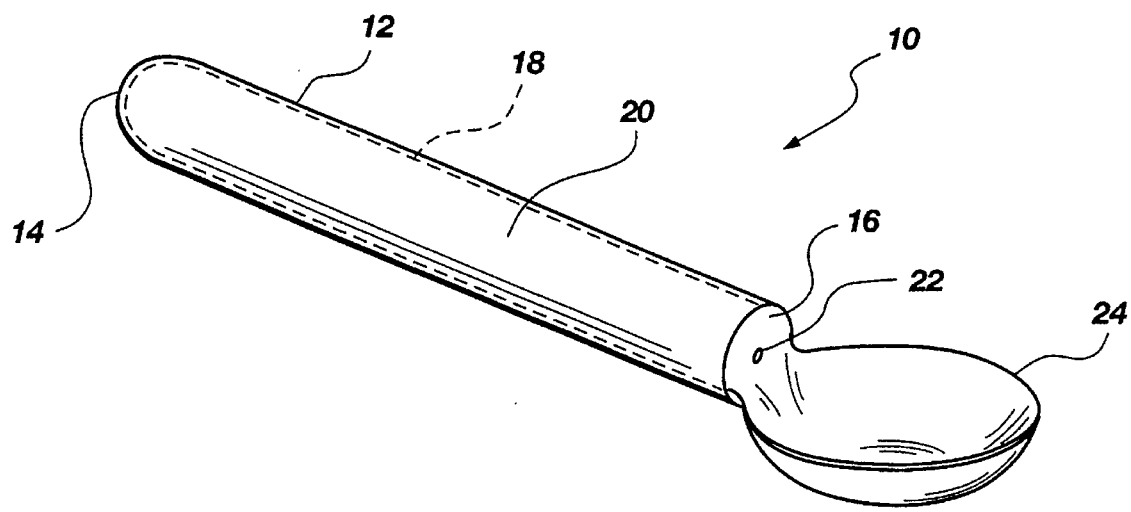
FIG. 1 illustrates a perspective view of one preferred embodiment of the invention.

FIG. 1 illustrates a preferred embodiment of the invention 10 for use in eating cold cereals. The cereal spoon 10 has a squeezable handle 12 with first and second ends 14, 16. The handle 12 has walls 18 defining an interior storage reservoir 20 into which milk or other similar fluids are stored before using. The handle 12 second end 16 has a port 22 in communication with the interior storage reservoir 20. When the handle 12 is squeezed, milk is expelled from the storage reservoir 20 through the port 22 to fill the bowl 24 attached proximate the second end 16 of the handle 12. To fill the handle 12, the handle 12 is squeezed and the port 22 is placed into a container of milk. The milk is then drawn into the storage reservoir 20, when the handle 12 is released. The spoon bowl 24 is then dipped into and filled with dry cereal by a user. Before eating, the user then squeezes the handle 12 and dispenses the desired amount of milk into the cereal filled bowl 24 to eat along with the cereal. By adding milk just before eating, the cereal retains its crispness.

This particular embodiment is constructed of a polyethylene single piece blow molded squeezable plastic handle 12 and bowl 24. The polyethylene plastic 12 handle is thick enough to support the spoon bowl 24, but not too thick to prevent the handle 12 from being squeezed.

Figure 2:
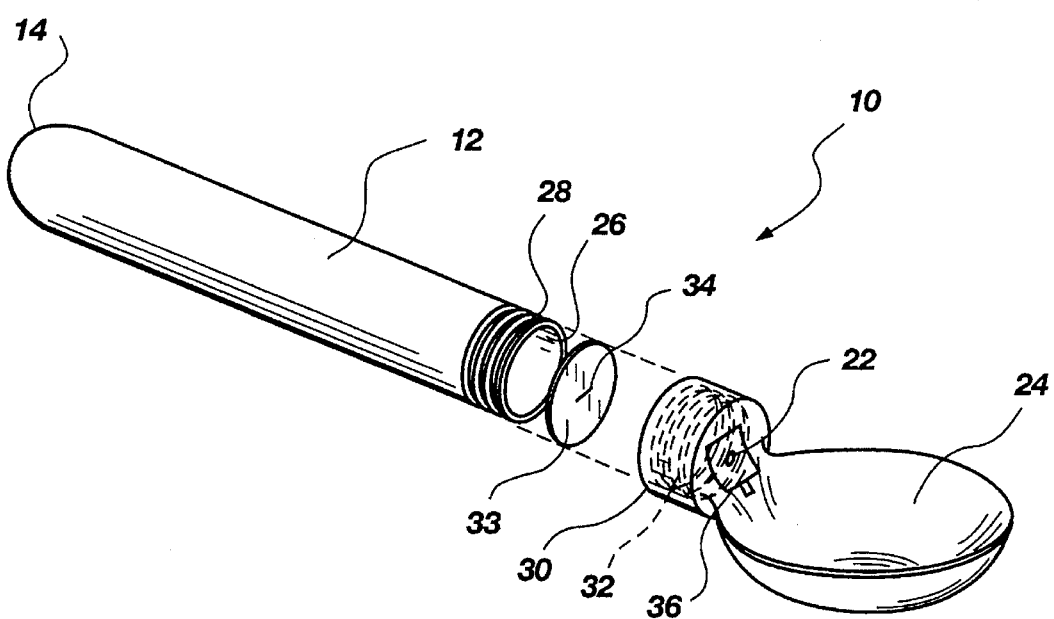
FIG. 2 illustrates a perspective view of one preferred embodiment of the invention FIG. 3 illustrated a top view of another preferred embodiment of the invention.

FIG. 2 is a top view of another preferred embodiment for use with liquids or powders. The handle 12 second end 16 defines an open fill top 26 in communication with the reservoir 20 having screw threads 28. The bowl 24 includes corresponding screw cap structure 30 sized to cover the open top 26 of the handle 12 and has corresponding internal screw threads 32 to screw onto the threads 28 of the open topped handle 12. To fill the handle, the screw cap bowl 24 is first unscrewed. The desired powder or liquid is then placed into the reservoir 20. If a liquid is to be used, a rubber gasket 33 with a small slit 34 may be positioned over the open top 26 of the handle such that the slit covers to port 22 to better regulate the flow of liquids through the port 22. To store powders, a removable sealing tape 36 may cover the port 22 until the spoon 10 is used.

Figure 3:
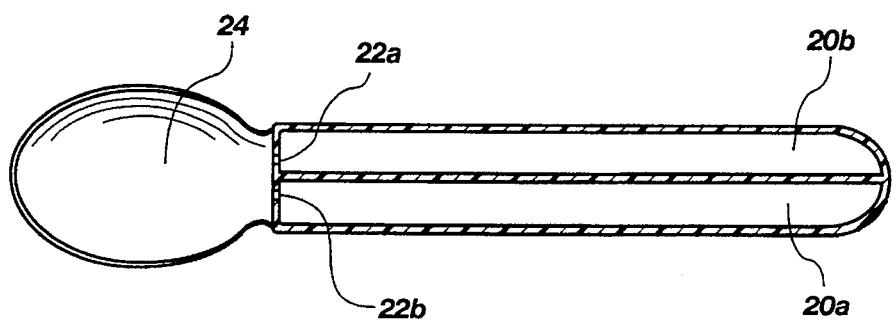

FIG. 3 is a top view of an embodiment which has two storage reservoirs 20a and 20b for use with snack puddings. These storage reservoirs 20a, 20b have separate ports 22a, 22b in close proximity to one another. When each reservoir 20a, 20b is separately filled with vanilla and chocolate pudding, they are admixed in the bowl 24 of the spoon 10 in a swirl pattern when the handle 12 is squeezed. This particular embodiment is particularly suited for swirl pudding snacks and is constructed of a transparent polyethylene material so that the filled dual reservoirs 20a, 20b can be seen through the handle 12, providing dual colors when filled to add to the appeal of the dispensing spoon. After the pudding is emptied, the dual reservoirs 22a, and 22b may be rinsed, and the spoon used as a cereal spoon in a manner similar to that shown in FIG. 1.

Figure 4:
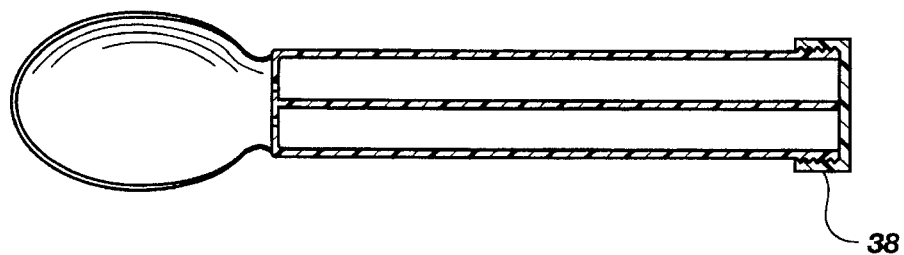
FIG. 4 illustrates a top view of another preferred embodiment of the invention.

FIG. 4 is a top view of another embodiment with a screw cap 38 covering the first end 14 defining an open ended handle 12 to aid in filling the reservoirs 22a, 22b with powders. After the handle is filled with a desired powder, the drain port 22a, 22b is sealed with a removable tape similar to that shown in FIG. 2 to prevent premature spillage. To use, the tape is removed and the powder allowed to fill the spoon bowl 24 with powder for stirring into water, or other liquids. The tape is then resealed over the ports 22a, 22b for storage of any remaining powders.

Figure 5:
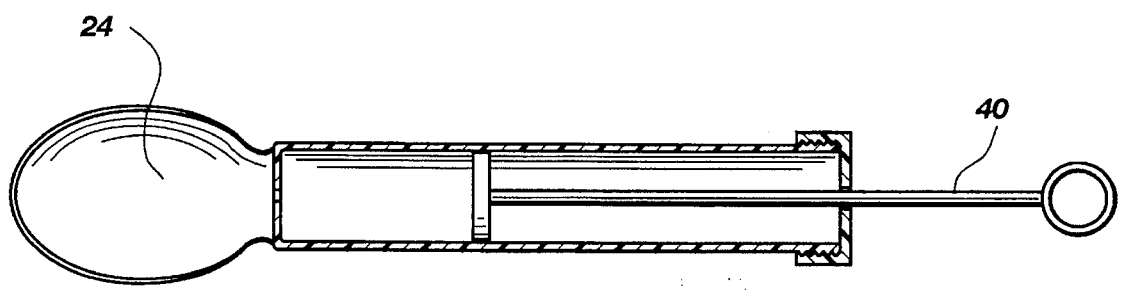
FIG. 5 illustrates a top view of another preferred embodiment of the invention.

FIG. 5 illustrates a spoon 10 with a rear mounted piston plunger system 40 operable associated with the first end 14 to selectively draw in fluids into the reservoir 20 via the ports 22 in a fill mode, and then empty the same by reversing the rear mounted piston plunger system 40 to expel fluids via the ports 22 into the spoon bowl 24.

Figure 6:
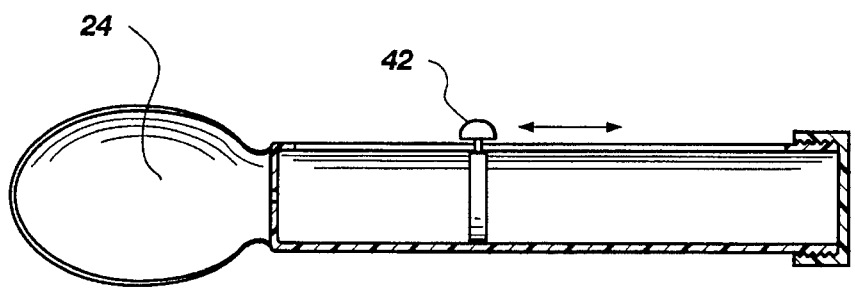
FIG. 6 illustrates a top view of another embodiment of the invention.

FIG. 6 illustrates a spoon 10 with a side mounted piston plunger system 42 operable associated with the sidewalls 18 to selectively draw in fluids into the reservoir 20 via the ports 22 in a fill mode, and then empty the same by reversing the side mounted piston plunger system 42 to expel fluids via the ports 22 into the spoon bowl 24.

Figure 7:
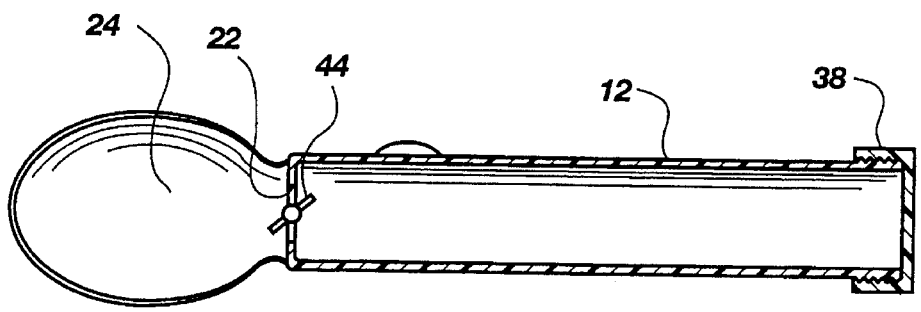
FIG. 7 illustrates a top view of another embodiment of the invention

FIG. 7 illustrates a spoon 10 adapted with a twist valve 44 covering the port 22 to selectively open and close the port 22. This twist valve 44 is generally used when powders are stored in the reservoir 20. Generally, the valve 44 is closed during filling via the screw cap 38. When desired, the powder contents of the reservoir 20 are then emptied into the bowl 24, and the valve 44 is closed. The powder may then be mixed into a liquid and stirred without concern about prematurely wetting the remaining powder stored in the reservoir 20.

Figure 8:
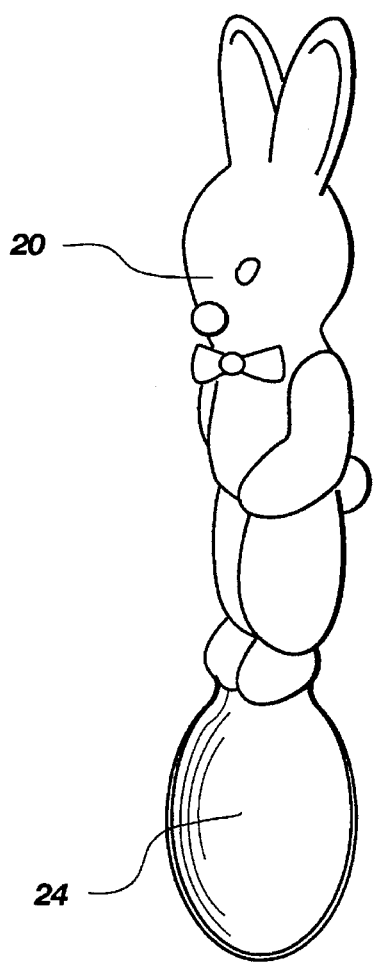
FIG. 8 illustrates another embodiment of the invention.

FIG. 8 is a translucent polyethylene plastic spoon 10 with a handle 12 and reservoir 20 in the shape of a rabbit. When filled with milk, the reservoir 20 turns the handle 12 of the spoon 10 white.

Figure 9:
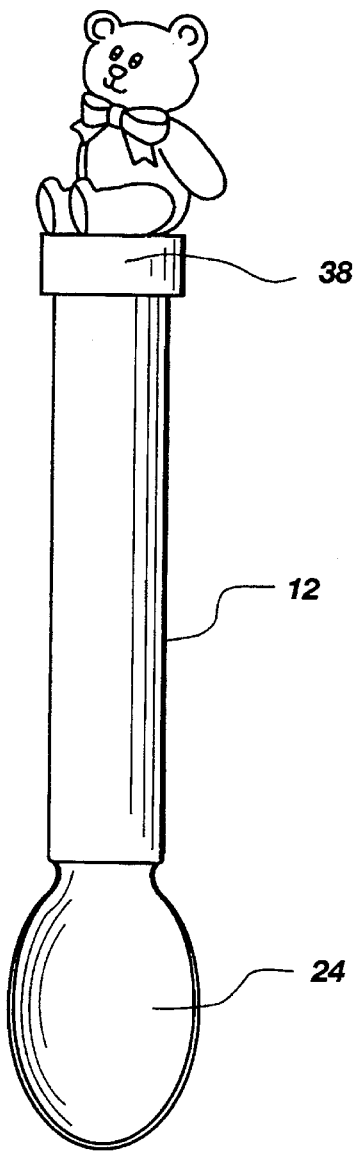
FIG. 9 illustrates another embodiment of the invention.

FIG. 9 illustrates a spoon 10 with a decorative cap 38 in the shape of a bear to please small children using the spoon 10.

Although the foregoing specification refers to the illustrated embodiments, it is not intended to restrict the scope of the appending claims. The claims themselves contain those restrictions deemed essential to the invention.

I claim:

1. A storage and dispensing spoon comprising:
   a. a handle with first and second ends having impervious walls defining at least one interior storage reservoir into which liquids or powders may be stored, said first end defining at least one port in communication with each respective interior storage reservoir through which liquids or powders may be expelled, or drawn into the storage vessel, and
   b. filling means associated with the handle and in communication with the reservoir to selectively fill the reservoir in a first mode, and empty the contents of the reservoir through the port in a second mode,
   c. a port covering associated with each port to selectively allow fluids and powders to enter and exit the reservoir in an open mode, and close the port in a second closed mode, and
   d. a spoon bowl attached to the first end of the handle proximate the port to receive liquids or powders stored within the storage reservoir when the handle is squeezed.

2. A storage and dispensing spoon according to claim 1, wherein the filling means comprises a squeezable handle with the handle walls defining two storage reservoirs, each respectively filled with different powders or liquids, and having separate ports in close proximity to one another to expel and admix the powders or liquids stored in the reservoirs into the spoon bowl in a swirl pattern when the handle is squeezed.

3. A storage and dispensing spoon according to claim 1, wherein the filling means comprises a squeezable handle with the second end of the handle defining a fill hole in communication with the reservoir through which liquids or powders may be expelled when the handle is squeezed, or drawn into the storage vessel when the port is submerged in a liquid or powder and the handle is squeezed and released, and including a removable plug to seal the fill hole after the handle is filled with a desired liquid or powder.

4. A storage and dispensing spoon according to claim 1, wherein the spoon is shaped, colored, and patterned.

5. A storage and dispensing spoon according to claim 1, wherein the spoon is constructed of a polyethylene plastic.

6. A storage and dispensing spoon according to claim 1, wherein the spoon is constructed of a translucent material which changes the color of the spoon handle when filled with liquids or powders.

7. A storage and dispensing spoon according to claim 1, wherein the filling means constitutes a piston pump mounted within the handle in communication with the reservoir to selectively fill the reservoir through the port when the piston is withdrawn, and empty the contents of the reservoir through the port when the piston is reversed.

8. A storage and dispensing spoon according to claim 11, wherein the port covering comprises a twist valve.

9. A storage and dispensing spoon according to claim 1, wherein the port covering comprises a reusable resealable tape.

* * * * *

UNITED STATES PATENT AND TRADEMARK OFFICE
CERTIFICATE OF CORRECTION

PATENT NO. : 5,491,895
DATED : Feb. 20, 1996
INVENTOR(S) : Lee

It is certified that error appears in the above-indentified patent and that said Letters Patent is hereby corrected as shown below:

On the last page, in the Claims, Claim 8, line 28, should refer back and be dependent upon --Claim 1--, not "Claim 11"

Signed and Sealed this

Fourth Day of June, 1996

Attest:

BRUCE LEHMAN

Attesting Officer

Commissioner of Patents and Trademarks